June 13, 1944.  O. F. CARLSON  2,351,190
PRESSURE AND TEMPERATURE RELIEF VALVE
Filed July 8, 1942
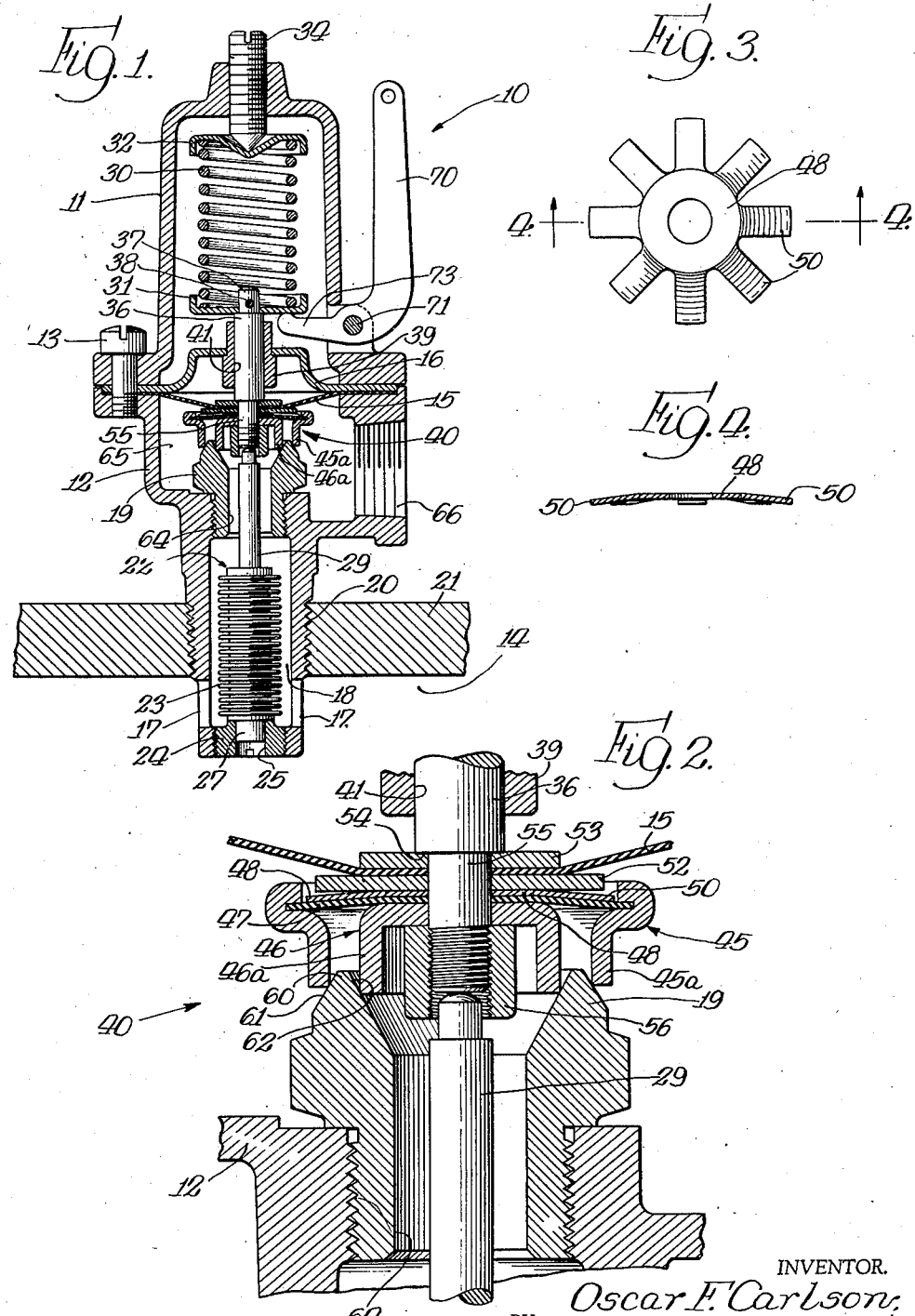
INVENTOR.
Oscar F. Carlson Patented June 13, 1944

2,351,190

UNITED STATES PATENT OFFICE 2,351,190

PRESSURE AND TEMPERATURE RELIEF VALVE

Oscar F. Carlson, Kenilworth, Ill.

Application July 8, 1942, Serial No. 450,121

7 Claims. (Cl. 236—92)

This invention relates generally to pressure and temperature relief valves and, more particularly, to a pressure and temperature relief valve employing a double cupped valve member for co-operation with the valve seat.

It is an object of the present invention to provide a safety valve mechanism which is responsive to predetermined conditions of pressure and/or temperature and which will provide a positive open and shut action. Water heating systems and closed space heating systems require such a protective device to prevent possible injury or damage to persons and property from the generation of excessive pressure in the systems. Such excessive pressure is generally the result of excessive heat input.

In many of the present day pressure relief valves or pressure and temperature relief valves there is a tendency for the valve to leak and dribble, or a tendency to chatter upon opening. Leaking is caused when a pressure is built up slightly in excess of the predetermined pressure. The valve is then unseated a little, but not fully, and pressure and steam and water leak out. The rate of heat input may be such that no further opening of the valve occurs since sufficient pressure for further opening is not generated. That may result in a rather steady leak through a partially unseated valve.

In addition to leaking and dribbling many of the valves on the market tend to chatter upon opening. Pressure in excess of the predetermined amount builds up and the valve pops open. Pressure is released to the predetermined level and the valve pops shut. In a moment, excessive pressure again opens the valve only to have it rapidly pop shut again. This is undesirable both because of the noise and vibration and because of the destructive pounding of the valve.

I have prevented this leaking, dribbling and chattering by providing a double valve member in the form of a pair of inverted, concentric cup-shaped elements for the valve seat. These valve elements are spring-loaded by one main spring which is adjustable for regulating the desired predetermined pressure. The inner and smaller cup-shaped element begins to open when the excessive pressure is reached. Pressure, of steam for example, leaks between said element and the seat to an enclosure bounded by the outer and larger cup-shaped element and the valve seat. This outer cup-shaped element immediately provides a much larger area for the pressure to act upon and as a result the whole double valve member is briskly lifted off its seat.

After pressure is released the valve will not close until the pressure is at a low enough level to permit the outer valve element to reseat itself which valve element is the first to reengage the valve seat.

The outer cup-shaped element is so mounted that its rim is resiliently urged in a direction toward the seat and, when unseated, lies slightly in advance of the rim of the inner valve member. It is this novel arrangement which permits the outer valve element to be the last to be unseated and the first to be reseated. Therefore, after the valve has opened, pressure has blown off and the double valve member has begun to descend toward its seat, the outer valve element will be the first to approach the valve seat. The whole valve will not close until the pressure has reached a low enough level to permit the outer element to come to seat. A pressure level low enough to allow the outer element to seat will, of course, not oppose the seating of the inner valve element since its surface area is much less than that of the outer valve element. So, when the outer element comes to seat, its mounting means flexes slightly as the inner valve element seats itself with a snap.

Another advantage of my valve construction is that the cup-shaped valve members may be stamped from sheet metal. Sharp edges or corners are then easily formed on the rims of these cups so that a sharp, reduced and definite area of contact may be had between the valve and its seat. Production of such valve elements is much less expensive and much more easily performed than the production of the ordinary valve member which has a conical shape and must be accurately formed to seat properly and tightly in a corresponding conical seat.

In addition to the aforesaid manufacturing advantages obtained by the use of such a valve member there are the following mechanical advantages: First, a definite, fixed and unvarying surface area is presented at all times to the pressure medium in contact with said valve. In the usual conical shaped valve on the other hand the surface area against which pressure acts increases as the valve begins to open since the formerly concealed outwardly extending conical edge of the valve is gradually exposed to the pressure medium. As a result it is very difficult to adjust the common type of valve to open sharply at a predetermined value of pressure. Secondly, with a sharp edge on the rim of the cup-shaped valve elements it is easy to obtain a tight fit between the valve and its seat, since a minimum area of contact between them is necessary. The ordinary valve in common use, however, has conical sides having a much greater area of contact with its seat. Such sides must therefore be very carefully formed to insure a tight fit between the valve and its seat.

In conjunction with the valve, which is primarily a pressure responsive mechanism, there is a cooperative temperature responsive element. This temperature responsive element may be set for a predetermined temperature in excess of which it will force or hold the valve open and permit the escape of heat and pressure. This temperature responsive element will act to keep the valve open when it has opened due to excess pressure if the temperature exceeds the predetermined amount, even though the pressure itself has been released. Such a situation might arise where excessive heat input generates excessive pressure and opens the valve, but due to the water supply then being cut off or reduced the heat input produces steam at a temperature in excess of the temperature of wet steam of the pressure at which the valve is set to blow off. In that case the valve will be prevented from closing by reason of the temperature responsive element.

Further advantages will be noted as I describe, in conjunction with the accompanying drawing, a preferred embodiment of my invention.

In the drawing:

Figure 1 is a vertical sectional view of my temperature and pressure relief valve;

Figure 2 is an enlarged view of the movable valve member and related elements of Figure 1;

Figure 3 is a detail view of the valve disc spring employed in the temperature and pressure relief valve of Figure 1; and Figure 4 is a cross sectional view of the valve disc spring along the line 4—4 of Figure 3.

Referring now to Figure 1, the numeral 10 indicates generally the temperature and pressure relief valve. This valve mechanism 10 is composed of an upper or housing part 11 and a lower or body part 12 clamped securely together by screws such as screw 13. Clamped securely between the upper and lower parts 11 and 12 respectively of the casing are a diaphragm 15 and a sheet metal guide plate 16. The diaphragm 15 is flexible and may be of "Neoprene" or of thin flexible metal. It may be corrugated. The diaphragm 15 serves to seal the upper portion 11 from the lower portion 12 of the casing. An inlet to the lower portion 12 is indicated by the reference numerals 17, 17. These apertures 17, 17 lead into a chamber 18 into the upper end of which is threaded the valve seat 19. The threads 20 of the lower part of the casing allow the temperature and pressure valve to be inserted into a port or hole in a wall 21 of the chamber 14 the temperature and pressure of which are to be regulated. The chamber wall is indicated by the reference numeral 21. It will be readily seen that the fluid within the chamber to be regulated fills the chamber 18 in the lower part 12 of the valve casing. Positioned in said chamber 18 is a temperature responsive device 22. This device 22 consists of an expansible bellows 23 filled with a liquid having a suitable rate of expansion in response to increases in temperature, a rod 29, borne on the upper end of the bellows 23, and a tail piece 27 at the lower end of said bellows.

A threaded insert 24 placed in the very lower end of the lower portion 12 of the valve casing serves as a seat for the lower end of the temperature responsive device 22. This threaded end piece 24 has a bore 25 into which is inserted the tail piece 27 of the temperature responsive device 22. At its upper end this device 22 carries a rod 29 which moves upwardly or downwardly as the bellows 23 responds to increases or decreases respectively in the temperature of the fluid within the chamber to be regulated.

In the upper portion 11 of the valve casing is located the coiled spring 30 which is used to load the valve indicated generally at 40. Spring 30 is carried between two plates 31 and 32 respectively. This spring 30 may be compressed between the plates 31 and 32 by turning the adjusting screw 34 downwardly. Adjusting screw 34 is borne in the upper end of the upper portion 11 of the valve mechanism 10. Its pointed end rests within a depression in the upper plate 32, and thus serves to guide as well as compress spring 30. The lower plate 31 rests against a shoulder of the rod 36, the reduced end 37 of which rod passes through a metal hole in the plate 31 and the lower end of which rod has a reduced portion 55 carrying the valve unit 40. A pin 38 fits within a hole in the upper reduced end 37 of the rod 36 to secure the plate 31 in place. The guide plate 16 supports at its center a sleeve 39 which has a bore 41 for guiding movement of the rod 36. This sleeve may be secured to the guide plate 16 by welding or other means.

Referring to Figures 1 and 2, the valve indicated generally at 40 will now be described. This valve 40 consists essentially of two inverted cup-shaped elements 45 and 46. The inner cup-shaped element 46 is rigid throughout. The outer cup-shaped valve element 45 consists primarily of a rim portion 45a and a flexible central portion 47 secured to the rim. Immediately above and adjacent to said flexible diaphragm 47 is a valve disc spring 48 which may be seen in plan view in Figure 3 and in section in Figure 4. The spring means of this valve disc spring is found in a number of downturned fingers 50, 50. Immediately above said valve disc spring 48 and adjacent thereto is a washer 52 which binds between itself and another washer 53 the spring diaphragm 15 which separates the upper and lower portions 11 and 12 respectively of the valve mechanism 10. Washer 53 bears against the shoulder 54 of the rod 36. The lower reduced end 55 of the rod 36 passes through central holes in each of the elements 53, 15, 52, 48, 47, and 46, all of which are secured firmly together by the nut 56 on the threaded end of reduced portion 55 of the rod 36.

The valve seat 19 consists of an annular ridge 60 and oppositely inclined conical walls 61 and 62 sloping downwardly from said ridge 60. The rim 45a of the outer cup-shaped valve element 45 has a sharply defined edge or corner resting upon the inclined wall 61. The rim 46a of the inner cup-shaped valve element 46 has a sharply defined edge or corner resting upon the inclined wall 62. Valve element 46 is seated firmly upon wall 62, whereas valve element 45 is resiliently seated on the outer inclined wall 61 by reason of the disc spring 48 acting upon the diaphragm 47. The passageway 64 through the valve seat 19 opens into chamber 65 of the lower portion 12 of the valve casing, and chamber 65 leads to the outlet 66. Rod 29 connected to the bellows 23 of the temperature responsive device 22 extends through passageway 64 and is adapted to abut against the lower reduced portion 55 of the rod 36. Normally these parts are out of contact.

If excessive heat input occurs, which causes the expansion of the temperature responsive device 22, the rod 29 will then push open the valve connected to end portion 55 against the compressive force of the spring 30. Temperature rise unaccompanied by pressure increase is not likely to cause opening of the valve. Heat carried by escaping fluid and pressure will thereby be released into chamber 65, and thence to the outlet 66 of the pressure and temperature valve mechanism. Lever 70 pivoted at 71 in the upper portion 11 of the valve casing affords a manual control for opening the valve 40. The short arm 73 of the lever 70 bears against the plate 31. Pulling the lever arm 70 downwardly and to the right as viewed in Figure 1 will raise the plate 31 and the rod 36, which is attached thereto and which bears the valve 40.

Assuming now that this valve is being used in connection with a hot water heating system or closed space heating system, its operation is as follows:

Fluid, such as steam, passes from the chamber to be regulated (chamber 14 of Figure 1) through the ports or apertures 17 in the lower end 12 of the valve mechanism 10 into the chamber 18 in which is located the thermally responsive device 22. This steam further flows through the passageway 64 in the valve seat 19 upwardly into contact with the inner surface of the inner valve member 46. If excessive pressure is generated within the chamber to be regulated, the steam pressure will act to push upwardly the inner valve member 46. It will be assumed, of course, that adjusting screw 34 has been adjusted to compress the spring 30 to hold the valve 40 against its seat until the predetermined excessive pressure has been attained. The cup 46 has a square corner at the edge which bears against the seat 62. This gives a very definite area upon which the pressure operates and gives a sharp calibration, as previously explained. As excessive pressure is attained, inner valve member 46 is raised slightly against the compressive force of spring 30 and steam pressure leaks past the lower edge of said inner valve member into the space between the inner valve member 46 and the outer valve member 45. Valve member 45 is not unseated simultaneously with the inner valve member 46 since it is resiliently mounted and urged slightly further downward than valve member 46. If valve member 46 rises only slightly it will therefore not pull valve member 45 up with it. The resilient mounting consists of a flexible diaphragm 47 acted upon by the valve disc spring 48 as previously described. As soon as the steam pressure can leak past valve member 46 it acts upon the area of the larger valve member 45 and the valve unit 40 is immediately pushed upwardly and away from the valve seat 19. This action results from the fact that the pressure from the chamber to be regulated when applied to the greater area afforded by the outer valve member 45 easily overcomes the compressive force of the spring 30 since the steam pressure was already overcoming the compressive force of said spring when the pressure was acting against the smaller area afforded by the inner valve member 46 alone. The steam then escapes into chamber 65 and thence through outlet 66 to atmosphere. No steam or water can escape into the upper portion 11 of the valve casing because of the flexible diaphragm 15.

After pressure has been released or blown down sufficiently the compressive force of spring 30 moves the valve unit 40 downwardly toward its seat again. Escaping pressure however is still acting upon the larger surface presented by the outer valve member 45 so that it is necessary for pressure to have been reduced to a level low enough to permit outer valve member 45 to seat itself before the complete valve 40 can be seated. The rim 45a of the outer valve member 45, due to the valve disc ring 48, tends to lie slightly in advance of the rim 46a of the inner valve member 46 as the valve unit 40 approaches its seat 19. Escaping pressure may prevent the rim 45a from being completely let downwardly but in general it will seat itself slightly before rim 46a. After inner valve member 46 is seated, the valve 40 will not again be unseated by pressure until such an amount of pressure is present as can unseat the inner valve 46 against the compression of the spring 30. If such pressure is attained and inner valve member 46 is unseated against the compression of spring 30, the pressure which leaks past valve member 46 will then act upon the larger area presented by the outer valve member 45 and then unseats the valve unit 40 as described above.

Adjustment of the thermal responsive device 22 and the compression spring 30 might be so arranged that the valve 40 would be opened due to excessive heat without excessive pressure. Generally this would not be desired. Should such adjustment be made, however, the heated fluid passing from the chamber 14 through port 17 into chamber 18 will act upon the thermal responsive device and cause the expansible bellows to carry the rod 29 upwardly against the valve 40 and unseat it. The expansive force produced by the fluid within the expansible bellows of the thermal responsive device 22 is such that it will always be greater than the compressive force of the spring 30 however adjusted. This means that the compressive spring 30 can never be adjusted to keep the thermal responsive device 22 from opening the valve 40 when a predetermined excessive temperature is attained.

Cooperation between the thermal responsive device 22 and the spring loaded valve 40 will now be described. Assume that sufficient heat input is permitted to generate excessive pressure. This will be the situation which the pressure and temperature relief valve 10 will normally be used to guard against. The result of such excessive pressure will be an opening of the valve 40 and an escape of steam or other heated fluid through the chamber 65 to the outlet 66. If for any reason the cold water input should be insufficient to absorb the heat input the temperature of the escaping steam will be above that at which the steam would have a pressure great enough to open the valve. The valve should not then be allowed to close. This thermally responsive element 23 will then maintain the valve 40 in open position until the temperature is reduced to the proper amount to permit the valve to become seated. The rate of heat input may be such that for the available cold water input the predetermined setting for the thermal responsive device will have been exceeded. This will cause the expansible bellows to expand and carry the rod 29 upwardly through the passageway 64 of the valve seat 19. Rod 29 may or may not contact the valve mechanism 40 in its open position depending upon the amount of excessive heat. Assume for example that the water supply is cut off in some manner, intended or otherwise, without any decrease in the rate of heat input. This lack of water would result in the excessive heat's driving off the small amount of water available in the form of steam. As soon as the steam is driven off to a point where the pressure is decreased, the valve 40 would tend to seat itself. The thermal responsive device 22 would prevent this seating by reason of rod's 29 being extended upwardly by the excessive heat. Rod 29 will then prevent the reseating of valve 40 so that heat may be permitted to escape and thus reduce the danger from the over-heated condition of the chamber to be regulated. If the excessive heat input is cut down or shut off rod 29 attached to the expansible bellows 23 of the thermal device 22 will then be retracted to permit the valve 40 to be reseated by the force of the compression spring 30.

Lever 70 may of course be manually used at any time to open the valve 40 and said lever may be secured in position to keep the valve open as long as is desired. This feature is a normal arrangement in most temperature and pressure relief valves.

While I have above described a preferred embodiment of my invention, I do not intend that this form should be considered limiting but merely illustrative. Various changes and modifications may be made without departing from the scope of my invention which is set out in the appended claims.

I claim:

1. A pressure and temperature relief valve comprising, in combination, a casing composed of an upper and a lower portion, said upper and lower portions being securely fastened together and clamping between them a guide plate and a flexible diaphragm to seal the upper portion of said casing from said lower portion, an inlet and an outlet in the lower portion of said casing for release of steam and liquid when the valve opens, an annular valve seat having inclined surfaces in the lower portion of said casing between the inlet and the outlet, a valve means for said seat comprising a pair of inverted concentric cups the rim of one of which cups seats on the outer inclined surface and the rim of the other on the inner inclined surface of the annular valve seat, an adjustable spring in the upper portion of the casing for loading said valve means, a shaft guided within said guide plate for transmitting the force of said spring to the valve means and for supporting at an intermediate portion the flexible diaphragm and carrying at its lower end the valve means, said other of said cups being fixed to said shaft for movement therewith, and means for mounting said one of said cups upon said shaft whereby it is movable relative thereto and to said other of said cups, a heat responsive bellows between the inlet and the valve seat, a thrust member borne by said bellows, said bellows being adapted to unseat or to continue unseated said double cupped valve when temperature in excess of the predetermined value is reached by means of the thrust member bearing against the said shaft and raising it against spring pressure.

2. In a pressure relief valve in combination, a valve seat formed as an annular ridge with oppositely inclined surfaces, a double cupped valve for said seat the inner of the inclined surfaces of said seat having one inverted cup-shaped closure element seated thereon and the outer of said oppositely inclined surfaces having the other inverted cup-shaped closure element seated thereon, a spring loaded shaft upon which are concentrically affixed said two cup-shaped closure elements which make up said double cupped valve, a spring disk on said shaft in engagement with said outer cup, the rim of the inner of said concentric cups being affixed to said common shaft by an integral rigid member forming the bottom of the cup which is subjected to the pressure of the chamber to be controlled, the rim of the outer of said concentric cups being affixed to said common shaft by a flexible member forming the bottom of the cup which is resiliently urged in the direction of said seat by said spring disc in engagement therewith, which flexible bottom member serves to give added surface upon which escaping pressure may act to open the valve and prevent chatter when the smaller cup has been unseated, and an expansible thermostatic element adapted to unseat or continue unseated said double cupped valve when a predetermined excessive temperature has been reached.

3. In combination, a valve housing having an inlet and an outlet, a valve seat element in said housing between the inlet and the outlet thereof, said valve seat element providing a pair of valve seats, a shaft, a first inverted cup-shaped valve rigidly attached to said shaft, spring means associated with said shaft for seating said first cup-shaped valve upon one of the seats of said valve seat element, a second inverted cup-shaped valve concentric with said first cup-shaped valve having a rigid rim portion and a flexible member forming the bottom thereof, and means including a spring element for mounting said second cup-shaped valve upon said shaft for movement relative thereto and to said first cup-shaped valve, said spring member being adapted to resiliently seat said second cup-shaped valve upon the other valve seat of said valve seat element.

4. In combination, a valve housing having an inlet and an outlet, a valve seat element in said housing between the inlet and the outlet thereof, said valve seat element providing a pair of valve seats, a shaft, a first inverted cup-shaped valve rigidly attached to said shaft, spring means associated with said shaft for seating said first cup-shaped valve upon one of the seats of said valve seat element, a second inverted cup-shaped valve concentric with said first cup-shaped valve having a rigid rim portion and a flexible member forming the bottom thereof, means including a spring element for mounting said second cup-shaped valve upon said shaft for movement relative thereto and to said first cup-shaped valve, said spring member being adapted to resiliently seat said second cup-shaped valve upon the other valve seat of said valve seat element, and temperature responsive means between the inlet and said valve seat element adapted to engage said shaft to unseat said cup-shaped valves at a predetermined temperature in the inlet of said valve housing.

5. In combination, a valve housing having an inlet and an outlet, a valve seat element comprising an annular ridge provided with oppositely inclined conical side walls each forming a valve seat, a shaft, a first inverted cup-shaped valve rigid with said shaft and having a square corner on its outer edge for engaging the inner inclined side wall of said valve seat element, spring means associated with said shaft for seating said first cup-shaped valve upon its seat, a second inverted cup-shaped valve having a rigid rim portion provided with a square corner on its inner edge for engaging the outer inclined wall of said valve seat element, said second cup-shaped element having a flexible member forming the bottom thereof, and means including a spring member for mounting said second cup-shaped member on said shaft concentrically of said first cup-shaped valve for movement relative thereto and to said shaft, said spring member being adapted to resiliently seat said second cup-shaped valve upon its seat.

6. In combination, a valve housing having an inlet and an outlet, a valve seat element comprising an annular ridge provided with oppositely inclined conical side walls each forming a valve seat, a shaft, a first inverted cup-shaped valve rigid with said shaft and having a square corner on its outer edge for engaging the inner inclined side wall of said valve seat element, spring means associated with said shaft for seating said first cup-shaped valve upon its seat, a second inverted cup-shaped valve having a rigid rim portion provided with a square corner on its inner edge for engaging the outer inclined wall of said valve seat element, said second cup-shaped element having a flexible member forming the bottom thereof, means including a spring member for mounting said second cup-shaped member on said shaft concentrically of said first cup-shaped valve for movement relative thereto and to said shaft, said spring member being adapted to resiliently seat said second cup-shaped valve upon its seat, and temperature responsive means adapted to engage said shaft to unseat said cup-shaped valves upon a predetermined excessive temperature in the inlet of said valve housing.

7. In a pressure relief valve in combination, a valve seat formed as an annular ridge with oppositely inclined surfaces, a double cupped valve for said seat, the inner of the inclined surfaces of said seat having one inverted cup-shaped closure element seated thereon and the outer of said oppositely inclined surfaces having the other inverted cup-shaped closure element seated thereon, a spring loaded shaft upon which are concentrically affixed said two cup-shaped closure elements which make up said double cupped valve, a spring disk on said shaft in engagement with said outer cup, the rim of the inner of said concentric cups being affixed to said common shaft by an integral rigid member forming the bottom of the cup which is subjected to the pressure of the chamber to be controlled, and the rim of the outer of said concentric cups being affixed to said common shaft by a flexible member forming the bottom of the cup which is resiliently urged in the direction of said seat by said spring disc in engagement therewith, which flexible bottom member serves to give added surface upon which escaping pressure may act to open the valve and prevent chatter when the smaller cup has been unseated.

OSCAR F. CARLSON.